United States Patent
Ferrari et al.

(10) Patent No.: US 10,010,813 B2
(45) Date of Patent: Jul. 3, 2018

(54) REDUCED FOAM PETROLEUM COMPOSITION

(71) Applicant: Dow Corning do Brasil Limitada, Sao Paulo (BR)

(72) Inventors: Adalberto Ferrari, Sao Paulo (BR); Alvaro Luiz Gomes, Sao Paulo (BR); Felipe Nascimento, Sao Paulo (BR)

(73) Assignee: Dow Brasil Sudeste Industrial Ltda, Sao Paulo (BR)

( * ) Notice: Subject to any disclaimer, the term of this patent is extended or adjusted under 35 U.S.C. 154(b) by 109 days.

(21) Appl. No.: 14/913,435

(22) PCT Filed: Aug. 26, 2014

(86) PCT No.: PCT/BR2014/000296
§ 371 (c)(1),
(2) Date: Feb. 22, 2016

(87) PCT Pub. No.: WO2015/061868
PCT Pub. Date: May 7, 2015

(65) Prior Publication Data
US 2016/0200988 A1    Jul. 14, 2016

Related U.S. Application Data

(60) Provisional application No. 62/899,472, filed on Nov. 4, 2013, provisional application No. 62/003,604, filed on May 28, 2014.

(51) Int. Cl.
*B01D 19/04* (2006.01)
*B01D 17/05* (2006.01)
(Continued)

(52) U.S. Cl.
CPC ....... *B01D 19/0409* (2013.01); *B01D 17/047* (2013.01); *C10G 33/04* (2013.01)

(58) Field of Classification Search
CPC ... B01D 19/0409; B01D 17/047; C10G 33/04
(Continued)

(56) References Cited

U.S. PATENT DOCUMENTS 3,865,544 A * 2/1975 Keil ................... B01D 19/0404
516/123
4,183,820 A * 1/1980 Theile .................... C10G 33/04
516/144
(Continued)

FOREIGN PATENT DOCUMENTS

CN     102676147     1/2015
GB     2244279       11/1991

OTHER PUBLICATIONS

Foam Blast® 230 (Product Sheet), Emerald Performance Materials, LLC, Charlotte, NC, USA, online @ www.emeraldmaterials.com, p. 1 of 1 (May 20, 2013).*

*Primary Examiner* — Daniel S Metzmaier
(74) *Attorney, Agent, or Firm* — Timothy J. Troy (57) ABSTRACT

A reduced foam or reduced foam and water petroleum composition includes crude oil and a preformed antifoam emulsion. The antifoam emulsion includes a hydrophilic continuous phase and a polyorganosiloxane dispersed in the hydrophilic continuous phase. The hydrophilic continuous phase may also contain a demulsifier. The antifoam emulsion includes less than 50 weight percent of a hydrophobic solvent. A method of reducing foam or foam and water in crude oil disposed in a tank is also described.

8 Claims, 4 Drawing Sheets

(51) Int. Cl.
  *B01D 17/04*    (2006.01)
  *C10G 33/04*    (2006.01)
  *C10G 33/00*    (2006.01)

(58) Field of Classification Search
  USPC .................. 516/144; 44/281, 301; 208/188;
  210/708
  See application file for complete search history.

(56) References Cited

U.S. PATENT DOCUMENTS

| | | | |
|---|---|---|---|
| 4,329,528 A | 5/1982 | Evans | |
| 4,460,493 A * | 7/1984 | Lomas | B01D 19/0409 |
| | | | 252/78.3 |
| 4,564,665 A | 1/1986 | Callaghan et al. | |
| 4,711,714 A | 12/1987 | Callaghan et al. | |
| 4,824,983 A * | 4/1989 | Fink | B01D 19/0409 |
| | | | 208/15 |
| 4,961,840 A * | 10/1990 | Goyal | C10B 55/00 |
| | | | 208/131 |
| 5,354,505 A | 10/1994 | Mendoza | |
| 5,423,901 A | 6/1995 | Mendoza | |
| 5,547,022 A * | 8/1996 | Juprasert | C09K 8/602 |
| | | | 166/263 |
| 5,861,453 A | 1/1999 | Datz-Siegel et al. | |
| 5,942,469 A | 8/1999 | Juprasert et al. | |
| 6,083,998 A * | 7/2000 | Romualdo | B01D 19/0404 |
| | | | 435/161 |
| 6,878,773 B2 * | 4/2005 | Marteaux | C08G 77/442 |
| | | | 524/588 |
| 7,427,350 B2 * | 9/2008 | Kremer | B01D 19/0409 |
| | | | 208/131 |
| 8,030,363 B2 * | 10/2011 | Saxena | C08L 83/12 |
| | | | 208/188 |
| 8,779,012 B2 | 7/2014 | Phukan et al. | |
| 8,790,427 B2 | 7/2014 | O'Rear et al. | |
| 8,840,691 B2 | 9/2014 | Cooper et al. | |
| 9,199,898 B2 | 12/2015 | O'Rear et al. | |
| 2009/0192234 A1 * | 7/2009 | Saxena | C08L 83/12 |
| | | | 516/139 |
| 2012/0024759 A1 | 2/2012 | Koczo et al. | |

\* cited by examiner

REDUCED FOAM PETROLEUM COMPOSITION

This application is a national stage entry of International Patent Application No. PCT/BR2014/00296, filed Aug. 26, 2014, which claims the benefit of U.S. Provisional Patent Application No. 61/899,472 as filed on Nov. 4, 2013 and U.S. Provisional Patent Application No. 62/003,604 as filed on May 28, 2014, the contents of which are incorporated herein by reference.

The present disclosure generally relates to a reduced foam petroleum compositions and to a reduced water petroleum composition. More specifically, the composition includes a preformed antifoam emulsion that includes a hydrophilic continuous phase and a polyorganosiloxane dispersed in the hydrophilic continuous phase. The present disclosure also relates to a petroleum composition having a preformed antifoam emulsion, the emulsion comprising a hydrophilic continuous phase and a polyorganosiloxane dispersed in the hydrophilic continuous phase and the hydrophilic continuous phase comprising a demulsifier.

DESCRIPTION OF THE RELATED ART

As crude oil rises from an oil wellbore, the crude oil typically moves up through risers towards the top of the wellbore. During this movement, the pressure of the crude oil decreases and any associated gas that may be trapped in the crude oil expands and it is progressively released. On emerging from the wellbore, the crude oil is typically supplied to an triphase separator oil/gas/water to remove water and both free and associated gas, which would otherwise come out of solution when the crude oil is maintained at atmospheric pressure, e.g. during transport or storage. During this process of separating the gas from the crude oil, the crude oil typically forms a stable foam such that liquid crude oil is carried over into a stream of the gas, thereby creating production process problems. Such carryover situations can, if not treated, result in severe production losses and long equipment downtimes, such as those associated with pump cavitations. For these reasons, the stability and breaking of foams is a subject of great importance to the oil industry.

In addition, the water injected during crude oil production may be emulsified into the crude oil resulting in water-in-oil emulsions. During the initial stages of process, it is important to separate free water and emulsified water to ensure that only the crude oil is carried forward for subsequent processing.

Currently, various silicones are added to crude oil in a hydrophobic solvent to control foaming. However, since many of the silicones are hydrophobic themselves, they become incorporated in the crude oil. The presence of silicones and water in the crude oil may sometimes cause downstream damage to hydro treatment catalytic processes in refineries. Accordingly, there remains an opportunity to develop improvements for reducing the amount of foam or foam and water in crude oil.

SUMMARY OF THE DISCLOSURE

The present disclosure provides a reduced foam petroleum composition. The present disclosure also provides a petroleum composition having reduced foam and reduced water. The compositions include crude oil and a preformed antifoam emulsion. The preformed antifoam emulsion includes a hydrophilic continuous phase and a polyorganosiloxane dispersed in the hydrophilic continuous phase. The hydrophilic continuous phase may contain a demulsifier. In addition, the emulsion includes less than 50 weight percent of a hydrophobic solvent.

This disclosure also provides a method of reducing foam or foam and water in crude oil disposed in a tank. The method includes the steps of supplying the crude oil to the tank wherein the crude oil includes water, and supplying the preformed antifoam emulsion to the tank. Subsequent to the aforementioned two steps, a combination of the crude oil, water, and the preformed antifoam emulsion is formed. The method also includes the step of separating the crude oil from the water in the presence of the preformed antifoam emulsion, wherein the step of separating is accomplished in the presence of the preformed antifoam emulsion wherein the antifoam emulsion includes less than 50 weight percent of a hydrophobic solvent.

BRIEF DESCRIPTION OF THE FIGURES

Other advantages of the present disclosure will be readily appreciated, as the same becomes better understood by reference to the following detailed description when considered in connection with the accompanying drawings wherein.

DETAILED DESCRIPTION OF THE DISCLOSURE

The present disclosure provides a reduced foam or a reduced foam and water petroleum composition, hereinafter described as the "composition." This composition includes, and may be, consist essentially of, or consist of, crude oil (that may itself include water, gas, and various other compounds that are present in the earth and not independently or separately added) and a preformed antifoam emulsion. As described in greater detail below, the terminology "reduced foam" or "reduced foam and water" describes that the composition of this disclosure exhibits less foam or water than a control composition that is identical except for (at least) the inclusion of the instant antifoam emulsion. Said differently, the control composition does not include the preformed antifoam emulsion and may not include one or more other components that are present in the instant composition. The terminology "consist essentially of" describes an embodiment wherein the composition is free of, or includes less than 10, 9, 8, 7, 6, 5, 4, 3, 2, 1, 0.5, or 0.1, weight percent of one or more compounds independently added that are not naturally occurring in the crude oil, such as independent polymers or solvents.

As used herein, the terms "a" and "an" are meant to encompass both the singular and the plural forms of the thing they modify. In plural form, the thing can be the same or different.

As used herein, the term "about" serve to reasonably encompass or describe minor variations in numerical values measured by instrumental analysis or as a result of sample handling. Such minor variations may be in the order of plus or minus 0% to 10% or plus or minus 0% to 5% of the numerical values.

Crude Oil

As first introduced above, the composition includes crude oil. Crude oil is typically a mixture of hydrocarbons that exists in liquid phase underground and tends to remain a liquid at atmospheric pressure above ground. In various embodiments, the crude oil may include from 83 to 87 weight percent of carbon, from 10 to 14 weight percent of hydrogen, from 0.1 to 2 weight percent of nitrogen, from 0.05 to 1.5 weight percent of oxygen, from 0.05 to 6 weight percent of sulfur, and less than about 0.1 weight percent of metals. The crude oil may include 15 to 60 weight percent of alkanes (paraffins), 30 to 60 weight percent of naphthenes, 3 to 30 weight percent of aromatics, and a remainder of asphaltics.

The crude oil is not particularly limited and may be any known in the art. For example, the crude oil may have an American Petroleum Institute gravity, or API gravity, of 7 to 70 degrees. As is known in the art, the API gravity is a measure of how heavy or light the crude oil is compared to water. If the API gravity is greater than 10, the crude oil is lighter than, and floats on, water. API gravity is an inverse measure of the relative density of the crude oil to the density of water. API gravity is gradated in degrees using a hydrometer.

More specifically API gravity can be calculated as (141.5/specific gravity of the crude oil)−131.5. Typically, crude oil is classified as light, medium or heavy, according to its measured API gravity. Light crude oil typically has an API gravity higher than 31.1° API (less than 870 kg/m$^3$). Medium crude oil typically has an API gravity between 22.3° API and 31.1° API (870 to 920 kg/m$^3$). Heavy crude oil typically has an API gravity below 22.3° API (920 to 1000 kg/m$^3$). Extra heavy crude oil typically has an API gravity below 10.0° API (greater than 1000 kg/m$^3$). Any one or more of these grades of crude oil may be utilized in this disclosure. In addition, the crude oil may be classified as natural or synthetic crude oil.

The crude oil may be present in the composition in any amount but is typically present in the composition in an amount of from 1 to 99, 5 to 95, 10 to 90, 15 to 85, 20 to 80, 25 to 75, 30 to 70, 35 to 65, 40 to 60, 45 to 55, or 40 to 50, parts by weight per 100 parts by weight of the composition. In additional non-limiting embodiments, all values and ranges of values, both whole and fractional, within one or more of the aforementioned ranges, are hereby expressly contemplated.

The crude oil may include one or more impurities, for example, sulfur (e.g. hydrogen sulfide and sulfuric acid). Alternatively, the crude oil may include one or more glycols and/or fatty acids that may be used to (eventually) remove the sulfur content. The crude oil may be described as "wet", i.e., including water.

Preformed Antifoam Emulsion

The composition also includes the preformed antifoam emulsion (hereinafter described as "antifoam emulsion" or "emulsion"). The antifoam emulsion is preformed in that the antifoam emulsion is not formed upon contact with the crude oil. The antifoam emulsion exists independently from any contact with or near the crude oil. As described in greater detail below relative to a method, the antifoam emulsion is typically formed and then added to the crude oil.

Emulsions are typically classified into different categories according to a chemical nature of a dispersed phase and a continuous phase. A first category is an oil-in-water (O/W) emulsion. An O/W emulsions typically include a non-polar dispersed phase (e.g., oil) in an aqueous continuous phase (e.g., water) which forms particles. For purposes of the instant disclosure, the terminology "oil" includes a polyorganosiloxane, as described in greater detail below.

The instant emulsion includes a hydrophilic continuous phase and a polyorganosiloxane dispersed in the hydrophilic continuous phase, e.g., as the "dispersed phase," such that the antifoam emulsion is typically an O/W emulsion. In various embodiments, the antifoam emulsion is, includes, consists essentially of, or consists of, the hydrophilic continuous phase and the polyorganosiloxane. The terminology "consists essentially of" describes that, in one embodiment, the antifoam emulsion includes less than 10, 9, 8, 7, 6, 5, 4, 3, 2, 1, 0.5, or 0.1, weight percent of a polymer (e.g. an organic polymer and/or polyorganosiloxane) that is not the polyorganosiloxane of the instant disclosure.

Hydrophilic Continuous Phase

The hydrophilic continuous phase may be any known in the art. Typically, the terminology "hydrophilic" describes that the continuous phase is polar and/or (a) protic and is water loving, as understood in the art. The continuous phase may be, includes, consists essentially of, or consists of, water, water-miscible organic solvents, polyglycols, alcohols, polar protic solvents, polar aprotic solvents, and combinations thereof. Various non-limiting examples of the continuous phase include water, tetrahydrofuran (THF), ethyl acetate, acetone, dimethylformamide (DMF), acetonitrile, dimethyl sulfoxide (DMSO), formic acid, n-butanol, isopropanol (IPA), nitromethane, ethanol, methanol, acetic acid, and combinations thereof. In various embodiments, the continuous phase is, includes, consists essentially of, or consists of, water. In other embodiments, the continuous phase includes 5, 10, 15, 20, 25, 30, 35, 40, 45, 50, 55, 60, 65, 70, 75, 80, 85, 90, 95, or about 100, weight percent of water. The balance may include or more of the aforementioned compounds. The water can be tap water, well water, potable or non-potable water, salt water, sea water, etc. The water may be purified or non-purified. The terminology "consisting essentially of" typically describes that the continuous phase (or water itself) includes less than 10, 9, 8, 7, 6, 5, 4, 3, 2, 1, 0.5, or 0.1, weight percent of a hydrophobic or non-polar solvent such as those described below. In additional non-limiting embodiments, all values and ranges of values, both whole and fractional, within one or more of the aforementioned ranges, are hereby expressly contemplated.

The continuous phase may be present in the emulsion in any amount but in various embodiments is present in a weight percent of 15 to 95, 20 to 90, 25 to 85, 30 to 80, 35 to 75, 40 to 70, 45 to 65, 50 to 60, or 55 to 60, weight percent. In additional non-limiting embodiments, all values and ranges of values, both whole and fractional, within one or more of the aforementioned ranges, are hereby expressly contemplated.

In another non-limiting embodiment of the present disclosure, the hydrophilic continuous phase may comprise a demulsifier. Accordingly, the present invention provides compositions and emulsions having both an antifoam and a demulsifier. Any demulsifier can be used in the compositions and emulsions of the present disclosure. For example, demulsifiers include, but are not limited to, polyglycols, polyglycol derivatives, non-ionic demulsifying agents, alkoxylated alkyl phenols, formaldehyde resins, epoxy resin alkoxylates, amine-initiated polyol block copolymers, silicone polyethers, and esters. The demulsifier helps to break down water-in-oil emulsions to release the water so that it can be removed from the crude oil.

In one embodiment, the demulsifier is a polyglycol. The continuous phase may contain the polyglycol as the only component, or may contain a solvent and/or water in addition to the polyglycol. When the continuous phase contains only polyglycol, the emulsion is a polyorganosiloxane dispersed in the polyglycol. The polyglycol may be present in an amount sufficient so that the weight ratio of the polyorganosiloxane to the polyglycol is any value from 2:1 to 1:50 or from 1:1 to 1:20 or from 1:2 to 1:20 or from 1:2.5 to 1:20 or from 1:3 to 1:20, alternatively, the weight ratio is 1:1, 1:5, 1:10 or 1:20. When the continuous phase comprises a solvent and/or water in addition to the polyglycol, the solvent and/or water may be added to adjust the viscosity. The amount of solvent and/or water is not greater than 60%, or not greater than 50%, or not greater than 15% by weight of the emulsion.

In another embodiment, the polyglycol can be added to a polyorganosiloxane-in-water emulsion, or the polyorganosiloxane can be emulsified in the polyglycol.

In another embodiment of the present disclosure, the continuous phase may contain a suspending agent that helps to suspend the polyorganosiloxane in the continuous phase. For example, the continuous phase may contain a suspending agent and a polyglycol with or without a solvent and/or water. The suspending agent can be polymeric, for example, polyacrylic polymer or cellulose derivatives. The amount of the suspending agent can be from about 0.05% to about 0.2% by weight of the emulsion.

The polyglycol can be an polyethylene oxide, polypropylene oxide or ethylene oxide/propylene oxide block copolymer (EO/PO copolymers) and is present from about 10% to about 95% by weight of the emulsion or from about 20% to about 95% by weight of the emulsion or from about 30% to about 93% by weight of the emulsion or from about 40% to about 93% by weight of the emulsion or from about 50% to about 93% by weight of the emulsion. The block copolymer can have a relative solubility number (RSN) of from about 9 to about 20 or from about 12 to about 17 or about 16.4. The RSN is determined by titrating water in a solution containing 1 g of block copolymer and 30 ml toluene (2.6 vol %) and ethylene glycol methyl ether (97.4 vol %). The RSN is reported as the amount of water (ml or gram) needed to make a solution turbid or cloudy. The ethylene oxide/propylene oxide block copolymer can be a poly(oxyethylene)-poly(oxypropylene) di-block copolymer or poly(oxyethylene)-poly(oxypropylene)-poly(oxyethylene) tri-block copolymer. The ethylene oxide/propylene oxide block copolymer can also be tetrablock and pentablock copolymers.

In one non-limiting embodiment, the ethylene oxide/propylene oxide block copolymer can have the formula:

$$HO(CH_2CH_2O)_m(CH_2CH(CH_3)O)_n(CH_2CH_2O)_wH$$

where m can vary from 10 to 400, n can vary from 10 to 100, and w can vary from 0 to 400.

In one embodiment, the present disclosure provides a reduced foam or foam and water petroleum composition comprising:

A. crude oil; and
B. a preformed antifoam emulsion comprising:
(1) a hydrophilic continuous phase, and
(2) a polyorganosiloxane dispersed in the hydrophilic continuous phase;

wherein the emulsion comprises more than 50 weight percent of a hydrophobic solvent and wherein the hydrophilic continuous phase comprises a demulsifier. In another embodiment, the hydrophilic continuous phase comprises a polyglycol as the demulsifier. In another embodiment, the hydrophilic continuous phase is a polyglycol.

In addition, the antifoam emulsion includes less than (or equal to) 50 and may include less than 45, 40, 35, 30, 25, 20, 15, 10, 9, 8, 7, 6, 5, 4, 3, 2, or 1, weight percent of a hydrophobic solvent. In still another embodiment, the composition is free of the hydrophobic solvent. The hydrophobic solvent is also not particularly limited and may be any known in the art. For example, the hydrophobic solvent may be, include, consist essentially of, or consist of, an oil or petroleum product. Alternatively, the hydrophobic solvent may be kerosene, petrol, fuel oil, lubricating oil, etc. In other embodiments, the hydrophobic solvent may be, include, consist essentially of, or consist of, hexane, benzene, toluene, dioxane, chloroform, ethers, naphtha, dichloromethane, etc. In still other embodiments, the hydrophobic solvent may be, include, consist essentially of, or consist of, any nonpolar solvent as appreciated in the art. The terminology "consist essentially of" describes an embodiment wherein the hydrophobic solvent includes less than 10, 9, 8, 7, 6, 5, 4, 3, 2, 1, 0.5, or 0.1, weight percent of water, a hydrophilic solvent, and/or a polar solvent.

Polyorganosiloxane

The polyorganosiloxane is not particularly limited and may be any known in the art. In various embodiments, the polyorganosiloxane is a chosen from: (a) trimethylsiloxy-terminated dimethyl, methyl(propyl(poly(ethyleneoxy)) hydroxy)siloxane, (b) hydroxy-terminated dimethyl siloxane, (c) dimethyl(3-(2-hydroxyethyl)propylether)), siloxy-terminated dimethyl siloxane, (d) a combination of trimethylsiloxy-terminated dimethyl siloxane, and a reaction product of dimethyl siloxane, vinyl-terminated and dimethyl, methylhydrogen siloxane, and (e) combinations thereof. In other embodiments, the polyorganosiloxane may be any one or more of the aforementioned either alone or in combination with one another. In still other embodiments, the polyorganosiloxane may be a branched or linear polydimethylsiloxane or a combination thereof.

In various embodiments, the polyorganosiloxane has the unit formula:

$$-(R_xSiO_{(4-x)/2})-$$

wherein each R is independently an organic group or a hydrocarbyl group having from 1 to 12 carbon atoms, i.e., 1, 2, 3, 4, 5, 6, 7, 8, 9, 10, 11, or 12, and x is 0, 1 or 2. More specifically, R may include methyl, ethyl, propyl, butyl, vinyl, cyclohexyl, phenyl, and/or tolyl groups, propyl groups, and combinations thereof. In one embodiment, at least some of the R groups are methyl groups. In another embodiment, all of the R groups are methyl groups. In still other embodiments, each R group may be chosen from an alkyl or aryl or aralkyl group having 1 to 36 carbon atoms, a fluoro group, a polyether group, an amino or amido group, a carboxy group, or combinations thereof. The polyorganosiloxane may include any number of the aforementioned units.

In other embodiments, the polyorganosiloxane is described as including one or more M, D, T, and/or Q units.

For example, the polyorganosiloxane may be or include one or more MQ resins including $R_3SiO_{1/2}$ units and $SiO_{4/2}$ units, TD resins including $RSiO_{3/2}$ units and $R_2SiO_{2/2}$ units, MT resins including $R_3SiO_{1/2}$ units and $RSiO_{3/2}$ units, MTD resins including $R_3SiO_{1/2}$ units, $RSiO_{3/2}$ units, and $R_2SiO_{2/2}$ units, and combinations thereof, wherein R is as described above.

The symbols M, D, T, and Q used above represent the functionality of structural units of polyorganosiloxanes including organosilicon fluids, rubbers (elastomers) and resins. The symbols are used in accordance with established understanding in the art. Thus, M represents the monofunctional unit $R_3SiO_{1/2}$. D represents the difunctional unit $R_2SiO_{2/2}$. T represents the trifunctional unit $RSiO_{3/2}$. Q represents the tetrafunctional unit $SiO_{4/2}$.

Generic structural formulas of these units are shown below, wherein R is as described above.

In additional embodiments, the polyorganosiloxane is further defined as a silicone fluid. The silicone fluid is typically PDMS but is not limited in this way. In various embodiments, the silicone fluid has a viscosity at 25° C. of from about 0.001 to about 50 Pa·s, typically from about 0.02 to about 10 Pa·s, and more typically from about 0.05 to about 5 Pa·s. The silicone fluid can be linear, branched, cyclic, or a mixture thereof. Mixtures of the aforementioned fluids may also be used. Many of the linear, branched, and cyclic silicone fluids have melting points below about 25° C. Such materials are also commonly described as silicone liquids, silicone fluids, or silicone oils. A detailed description of non-limiting silicone fluids can be found in many references, including "Chemistry and Technology of Silicones" by W. Knoll, Academic Press, 1968, which, in one embodiment, is incorporated herein by reference relative to the silicone fluids.

Non-limiting examples of linear silicone fluids suitable for use herein include trimethylsiloxy-terminated dimethylsiloxane fluids. These silicone fluids are manufactured to yield essentially linear oligomers and/or polymers typically having a viscosity of from 0.001 to about 50 Pa·s at 25° C. Such fluids are primarily linear but can include cyclic and/or branched structures. In one embodiment, the silicone fluid is a trimethylsiloxy-terminated polydimethylsiloxane having a viscosity of about 0.1 Pa·s at 25° C.

Additional non-limiting examples of suitable cyclic silicone fluids include the cyclic polydimethylsiloxanes which may include varying amounts of octamethylcyclotetrasiloxane and decamethylcyclopentasiloxane. Mixtures of the straight-chain and cyclic dimethyl may also be utilized. Even additional non-limiting examples of suitable silicone fluids are $Me_3SiO[(OSiMe_3)_2SiO]SiMe_3$ and $Me_3SiO[(OSiMe_3)MeSiO]SiMe_3$.

In other embodiments, the polyorganosiloxane is a fluorosilicone. Alternatively, one or more of the aforementioned methyl groups on a siloxane backbone (such as PDMS) may be replaced by alkyl, aryl, ether, halo, and/or amino/amido groups. Moreover, the polyorganosiloxane may include silica particles.

The polyorganosiloxane is not limited relative to viscosity or molecular weight. In various embodiments, the polyorganosiloxane has a weight average molecular weight of greater than 20,000, 25,000, 30,000, 35,000, 40,000, 45,000, or 50,000, g/mol. In other embodiments, the polyorganosiloxane has a weight average up to 1,250,000, 1,000,000, 950,000, 900,000, 850,000, 800,000, 750,000, 700,000, 650,000, 600,000, 550,000, 500,000, 450,000, 400,000, 350,000, 300,000, 250,000, 200,000, 150,000, or 100,000, g/mol. In still other embodiments, the polyorganosiloxane has a weight average molecular weight of from 30,000 to 1,250,000, 20,000 to 400,000, 25,000 to 395,000, 30,000 to 390,000, 35,000 to 385,000, 40,000 to 380,000, 45,000 to 375,000, 50,000 to 370,000, 55,000 to 365,000, 60,000 to 360,000, 65,000 to 355,000, 70,000 to 350,000, 75,000 to 345,000, 80,000 to 340,000, 85,000 to 335,000, 90,000 to 330,000, 95,000 to 325,000, 100,000 to 320,000, 105,000 to 315,000, 110,000 to 310,000, 115,000 to 305,000, 120,000 to 300,000, 125,000 to 295,000, 130,000 to 290,000, 135,000 to 285,000, 140,000 to 280,000, 145,000 to 275,000, 150,000 to 270,000, 155,000 to 265,000, 160,000 to 260,000, 165,000 to 255,000, 170,000 to 220,000, 175,000 to 215,000, 180,000 to 210,000, 185,000 to 205,000, 190,000 to 200,000, or 195,000 to 200,000, g/mol. These molecular weights are reported as measured using methods well known to those of skill in the art. In additional non-limiting embodiments, all values and ranges of values, both whole and fractional, within one or more of the aforementioned ranges, are hereby expressly contemplated. In other embodiments, the polyorganosiloxane may be any one or more of the aforementioned either alone or in combination with one another.

The polyorganosiloxane may be present in the composition in a weight percent of from 1 to 20, 2 to 19, 3 to 18, 4 to 17, 5 to 16, 6 to 15, 7 to 14, 8 to 13, 9 to 12, 10 to 11, 1, 2, 3, 4, 5, 6, 7, 8, 9, 10, 11, 12, 13, 14, 15, 16, 17, 18, 19, or 20, parts by weight per one million parts by weight of the crude oil. The polyorganosiloxane may be present in the emulsion in a weight percent of from 1 to 85, from 5 to 85, from 5 to 80, from 5 to 75, from 5 to 70, from 5 to 60, from 1 to 60, 5 to 55, 10 to 50, 15 to 45, 20 to 40, 25 to 30, or 30 to 35, parts by weight per 100 parts by weight of the emulsion. In additional non-limiting embodiments, all values and ranges of values, both whole and fractional, within one or more of the aforementioned ranges, are hereby expressly contemplated.

Water

The petroleum typically includes crude oil water that is independent from the water of the antifoam emulsion. For example, the petroleum may include 1 to 99, 5 to 95, 10 to 90, 15 to 85, 20 to 80, 25 to 75, 30 to 70, 35 to 65, 40 to 60, 45 to 55, or 50 to 55, weight percent of water. The petroleum may also include one or more gasses such as alkane gases, e.g. methane, propane, butane, and/or natural gas. The crude oil may include 1 to 50, 5 to 45, 10 to 40, 15 to 35, 20 to 30, or 25 to 30, volume percent of the one or more gasses, e.g. $H_2S$, CO and/or $CO_2$. As is understood in the art, the amount of the one or more gasses may fluctuate depending on an age of an oil well, type of crude oil, etc. In still other embodiments, the composition and/or the crude oil may include less than 1, 0.9, 0.8, 0.7, 0.6, 0.5, 0.4, 0.3, 0.2, 0.1, 0.05, or 0.01, weight percent of a hydrophobic solvent based on a weight of the crude oil. In additional non-limiting embodiments, all values and ranges of values, both whole and fractional, within one or more of the aforementioned ranges, are hereby expressly contemplated.

Surfactant

The composition and/or antifoam emulsion may also include one or more surfactants. Typically, the one or more surfactants are nonionic surfactants, anionic surfactants, or combinations thereof. Suitable non-ionic surfactants include alkyl polyglucoside and/or an alkyl alkoxylated alcohol. In various embodiments, non-ionic alkyl alkoxylated alcohols include $C_{8-18}$ alkyl alkoxylated alcohol, typically a $C_{8-18}$alkyl ethoxylated alcohol, typically the alkyl alkoxylated alcohol has an average degree of alkoxylation of from 1 to 50, typically from 1 to 30, or from 1 to 20, or from 1 to 10, typically the alkyl alkoxylated alcohol is a $C_{8-18}$alkyl ethoxylated alcohol having an average degree of ethoxylation of from 1 to 10, typically from 1 to 7, more typically from 1 to 5 and most typically from 3 to 7. The alkyl alkoxylated alcohol can be linear or branched, and substituted or un-substituted. Suitable non-ionic surfactants can be selected from the group consisting of: $C_{8-18}$ alkyl ethoxylates, such as, NEODOL® non-ionic surfactants from Shell; $C_6$-$C_{12}$ alkyl phenol alkoxylates wherein typically the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$mid-chain branched alkyl alkoxylates, typically having an average degree of alkoxylation of from 1 to 30; alkylpolysaccharides, typically alkylpolyglycosides; polyhydroxy fatty acid amides; ether capped poly(oxyalkylated) alcohol surfactants; and mixtures thereof.

Alternative examples of non-ionic surfactants include condensates of ethylene oxide with long chain fatty alcohols or fatty acids such as a alcohol having 12 to 16 carbon atoms, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain (12 to 14 carbon atoms) alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, and polymeric surfactants such as polyvinyl alcohol (PVA) and polyvinylmethylether.

Representative examples of suitable commercially available non-ionic surfactants include polyoxyethylene fatty alcohols sold under the tradename BRIJ® by Croda. Some examples are BRIJ® L23, an ethoxylated alcohol known as polyoxyethylene (23) lauryl ether, and BRIJ® L4, another ethoxylated alcohol known as polyoxyethylene (4) lauryl ether. Some additional non-ionic surfactants include ethoxylated alcohols sold under the trademark TERGITOL® by The Dow Chemical Company, Midland, Mich. Some example are TERGITOL® TMN-6, an ethoxylated alcohol known as ethoxylated trimethylnonanol; and various of the ethoxylated alcohols, i.e., the 12-14 carbon atoms secondary alcohol ethoxylates, sold under the trademarks TERGITOL® 15-S-5, TERGITOL® 15-S-12, TERGITOL® 15-S-15, and TERGITOL® 15-S-40. Surfactants containing silicon atoms may also be used.

Anionic surfactants can include sulphate and sulphonate surfactants. Typical sulphonate surfactants include alkyl benzene sulphonate, typically $C_{10}$-$C_{13}$alkyl benzene sulphonate. Suitable alkyl benzene sulphonate (LAS) is obtainable, typically obtained, by sulphonating commercially available linear alkyl benzene (LAB); suitable LAB includes low 2-phenyl LAB, such as those supplied by Sasol under the trade name Isochem® or those supplied by Petresa under the trade name Petrelab®, other suitable LAB include high 2-phenyl LAB, such as those supplied by Sasol under the trade name Hyblene®. A suitable anionic surfactant is alkyl benzene sulphonate that is obtained by DETAL catalyzed process, although other synthesis routes, such as HF, may also be suitable. Typical sulphate surfactants include alkyl sulphate, typically $C_8$-$C_{18}$alkyl sulphate, or predominantly $C_{12}$ alkyl sulphate. Another typical sulphate surfactant is alkyl alkoxylated sulphate, typically alkyl ethoxylated sulphate, typically a $C_8$-$C_{18}$alkyl alkoxylated sulphate, typically a $C_8$-$C_{18}$alkyl ethoxylated sulphate, typically the alkyl alkoxylated sulphate has an average degree of alkoxylation of from 0.5 to 20, typically from 0.5 to 10, typically the alkyl alkoxylated sulphate is a $C_8$-$C_{18}$alkyl ethoxylated sulphate having an average degree of ethoxylation of from 0.5 to 10, typically from 0.5 to 7, more typically from 0.5 to 5 and most typically from 0.5 to 3. The alkyl sulphate, alkyl alkoxylated sulphate and alkyl benzene sulphonates may be linear or branched, substituted or un-substituted.

Suitable organic anionic surfactants include alkyl aryl sulphonates, for example sodium dodecyl benzene sulphonate, long chain (fatty) alcohol sulphates, olefin sulphates and sulphonates, sulphated monoglycerides, sulphated esters, sulphonated or sulphated ethoxylate alcohols, sulphosuccinates, alkane sulphonates, alkali metal soaps of higher fatty acids, phosphate esters, alkyl isethionates, alkyl taurates and/or alkyl sarcosinates.

Alternative examples of suitable anionic surfactants include alkyl sulphates such as lauryl sulphate, polymers such as acrylates/alkyl (10 to 30 carbon atoms) acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulforecinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, alkarylsulfonates, alkali metal soaps of higher fatty acids, alkylaryl sulphonates such as sodium dodecyl benzene sulphonate, long chain fatty alcohol sulphates, olefin sulphates and olefin sulphonates, sulphated monoglycerides, sulphated esters, sulphonated ethoxylated alcohols, sulphosuccinates, alkane sulphonates, phosphate esters, alkyl isethionates, alkyl taurates, and alkyl sarcosinates.

Suitable surfactants may also include amphoteric surfactants, for example, but not limited to, imidazoline compounds, alkylaminoacid salts, betaines, cocamidopropyl betaine, cocamidopropyl hydroxysulfate, cocobetaine, sodium cocoamidoacetate, cocodimethyl betaine, N-coco-3-aminobutyric acid and imidazolinium carboxyl compounds.

Suitable surfactants may also include cationic surfactants, for example, but not limited to, quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, quaternary ammonium bases of benzimidazolines, polypropanolpolyethanol amines, alkylamine salts, sulphonium salts, and phosphonium salts.

The above surfactants may be used individually or in combination.

The surfactant may be included in the emulsion in an amount of from 0.1 to 15, from 0.5 to 15, from 1 to 15, from 2 to 14, from 3 to 13, from 4 to 12, from 5 to 11, from 6 to 10, from 7 to 9, from 8 to 9, parts by weight per 100 parts by weight of the emulsion. As is understood in the art, the amount of the emulsion may fluctuate depending on a weight percent of the polyorganosiloxane utilized.

In another embodiment, the present invention provides a reduced foam petroleum composition, the composition consisting of:
A. crude oil; and
B. a preformed antifoam emulsion consisting of:
(1) a hydrophilic continuous phase;
(2) a polyorganosiloxane dispersed in said hydrophilic continuous phase; and
(3) less than 50 weight percent of a hydrophobic solvent.
In one embodiment, the preformed antifoam emulsion further consists of one or more surfactants.

In another embodiment, the present invention provides a reduced foam and reduced water petroleum composition, the composition consisting of:
A. crude oil; and
B. a pre-formed antifoam emulsion consisting of:
(1) a hydrophilic continuous phase containing a demulsifier;
(2) a polyorganosiloxane dispersed in the hydrophilic continuous phase; and
(3) less than 50 weight percent of a hydrophobic solvent.
In one embodiment, the preformed antifoam emulsion further consists of one or more surfactants.

Use of the Composition

The composition and/or antifoam emulsion is typically used to reduce foam height of petroleum, such as crude oil. However, the use of the composition is not particularly limited. The composition and/or antifoam emulsion may be used in any location or in any method that is utilized to drill for or process petroleum, crude oil, etc. In one embodiment, the composition and/or antifoam emulsion is utilized on/in an oil rig, such as an off-shore oil platform. It is contemplated that, in such an embodiment, sea water may be used to form or dilute the antifoam emulsion. Alternatively, the composition and/or antifoam emulsion may be utilized at/in a petroleum refinery. The composition and/or antifoam emulsion may be useful for decreasing the number of containers in off-shore oil platforms providing safer solutions for the water/gas/oil separation in crude oil primary processing.

In some embodiments, the compositions, antifoam emulsions and/or methods of the present invention do not contain silica. Thus, compositions and/or antifoam emulsions have zero weight percent added silica. The crude oil after treatment with the compositions and/or antifoam emulsions of the present invention have reduced residual Si content, which is beneficial for subsequent processing and refining steps. The compositions and/or antifoam emulsions of the present invention are useful for the processing of crude oil, for example, added just before the three-phase separator in the first step of oil processing. Accordingly, the compositions and/or antifoam emulsions are used after crude oil extraction or production from subterranean formations. The compositions and/or antifoam emulsions improve the separation of water and gas from crude oil in a three-phase separation step on the production platform, such as those that are off-shore or on land.

Method of Reducing Foam in Crude Oil Disposed in a Tank

Figure 1:
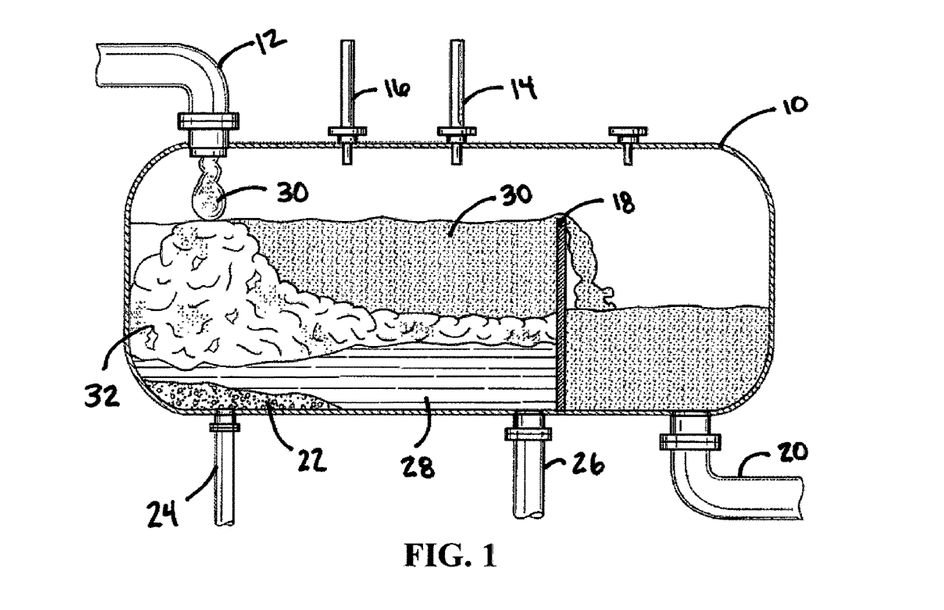
FIG. 1 is a perspective view of one embodiment of an oil/gas separator that may be utilized in the method of this disclosure.
Figure 2:
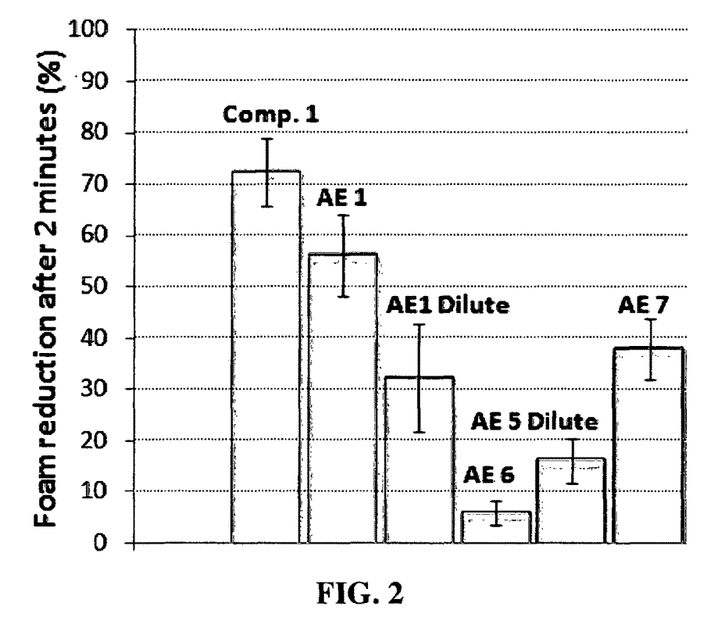
FIG. 2 is a bar graph showing foam reduction (%) after two minutes as a function of Example relative to crude oil having an API gravity of 26.
Figure 3:
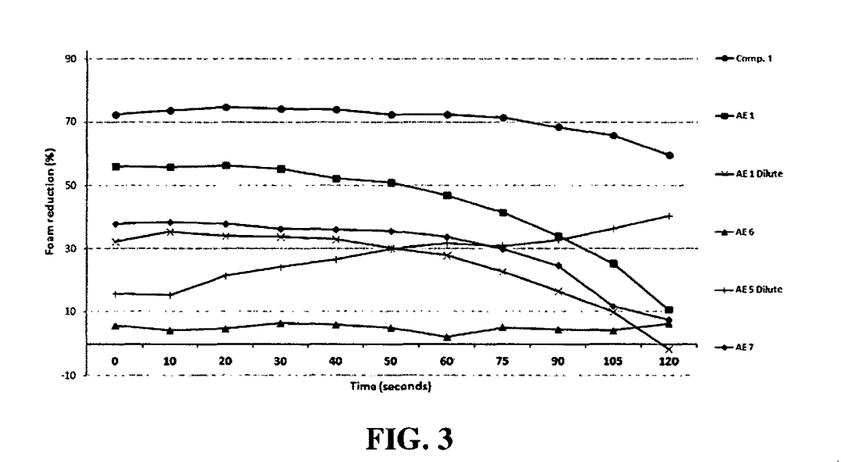
FIG. 3 is a line graph showing foam reduction (%) as a function of time relative to crude oil having an API gravity of 26.
Figure 4:
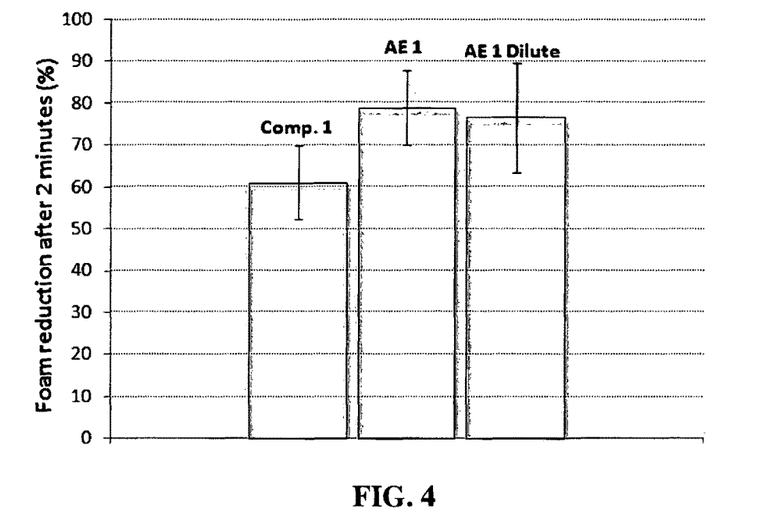
FIG. 4 is a bar graph showing foam reduction (%) after two minutes as a function of Example relative to crude oil having an API gravity of 14.5.
Figure 5:
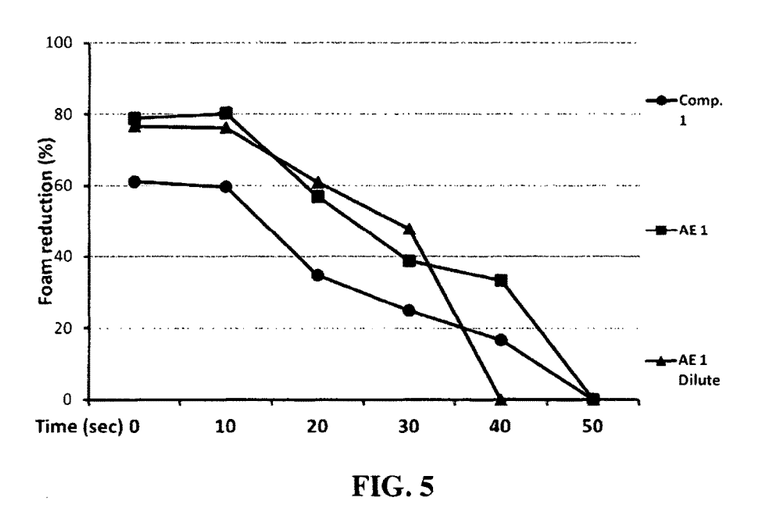
FIG. 5 is a line graph showing foam reduction (%) as a function of time relative to crude oil having an API gravity of 14.5.
Figure 6:
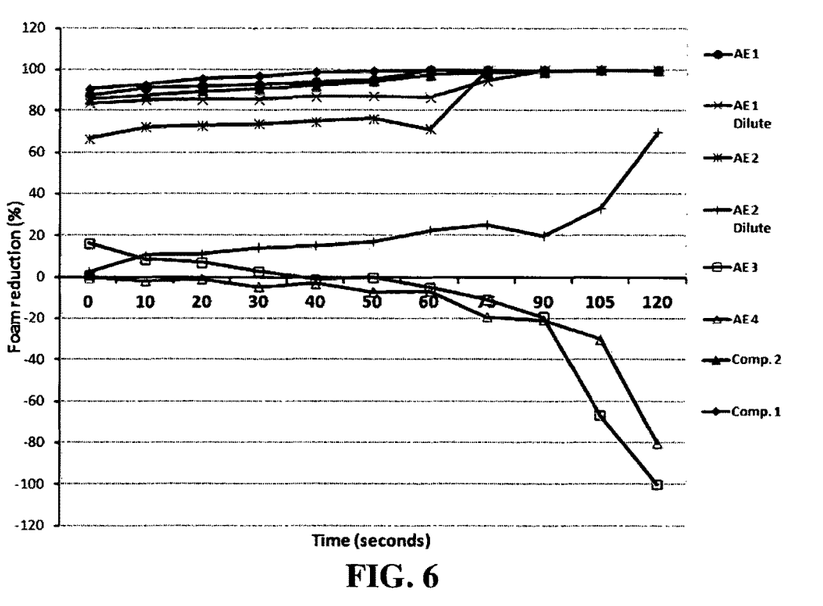
FIG. 6 is a line graph showing foam reduction (%) as a function of time relative to crude oil having an API gravity of 22.

The disclosure also provides a method of reducing foam (32) in crude oil (30) disposed in a tank (10) The tank (10) may be further defined as an oil/gas separator, e.g. as set forth in FIG. 1, or any type of container. Alternatively, the tank (10) may be further defined as any vessel that separates fluids from an oil well into gas and two types of liquids: crude oil (30) and water (28). The tank (10), e.g. a (three-phase) separator, can be horizontal, vertical or spherical. The separator may be further defined as a free-water (28) knock-out (FWKO) separator. The tank (10) may be further described as a package. The package or tank (10) may be fitted to a well head and disposed after a choke valve but before a production manifold. The package or tank (10) may allow the crude oil (30) to be pumped onto or into a pipeline, storage tank (10), tanker, etc.

The method includes the step of supplying the crude oil (30) to the tank (10). The crude oil (30) may be supplied to the tank (10) by any method known in the art. The step of supplying the crude oil (30) to the tank (10) may be further defined as pumping the crude oil (30) from an oil well into the tank (10), e.g. through one or more valves, pumps, lines, pipes, etc. For example, the crude oil (30) may leave the well head under high pressure of greater than 23,000 pounds per square inch (1,600 atm) which may be dampened at the choke valve or blow-out preventer. The crude oil (30) may then flow into the tank (10). In one embodiment, the crude oil (30) is supplied to the tank (10) through a line (12), as set forth in FIG. 1.

In one embodiment, the compositions and emulsions of the present invention is added after the well head and before the separator. For example, the compositions and emulsions may be injected at the inlet side of the separator (for example, through the line (12) in FIG. 1) which is on board at an offshore platforms or over a soil surface of inshore extraction sites.

The method also includes the step of supplying the antifoam emulsion to the tank (10). The antifoam emulsion may be supplied by any method in the art. For example, the antifoam emulsion may be formed off site and used directly, formed off site and then diluted and used on site, or formed on-site and either used or further diluted. The antifoam emulsion may be formed prior to being supplied to the tank (10) or may be formed from multiple streams coming together in or immediately before the tank (10). However, the antifoam emulsion is formed before any contact with the crude oil (30) and is not formed upon contact with the crude oil (30). In one embodiment, the antifoam emulsion is supplied to the tank (10) via line (16), as set forth in FIG. 1.

The step of supplying the crude oil (30) to the tank (10) and the step of supplying the antifoam emulsion to the tank (10) may occur sequentially, in any order, or simultaneously. These steps typically result in a combination or mixture being formed in the tank (10) subsequent to these steps. More specifically, the combination typically includes the crude oil (30), water, and the antifoam emulsion. Most typically, the water of the combination includes the water from the crude oil (30) and may include water from the antifoam emulsion.

To be clear, the antifoam emulsion of this disclosure is not an emulsion that may result from the crude oil (30) and water (28) being present in the tank (10) prior to introduction of the antifoam emulsion to the tank (10). Said differently, the antifoam emulsion of this disclosure is not formed in-situ in the tank (10) upon contact with the crude oil (30). Similarly, the composition of this disclosure is not the crude oil (30), the water present in the crude oil (30), and any silicone or polyorganosiloxane that is added thereto in a hydrophobic solvent, such as kerosene.

The method also includes the step of separating the crude oil (30) from the water (28) in the presence of the antifoam emulsion wherein the antifoam emulsion includes less than 50, 45, 40, 35, 30, 25, 20, 15, 10, 9, 8, 7, 6, 5, 4, 3, 2, or 1, weight percent of hydrophobic solvent. The step of separating may be accomplished in the absence of a hydrophobic solvent.

In one embodiment, the crude oil (30) is separated in the gas/oil separator, e.g. as set forth in FIG. 1, and flows over a vertical wall (18). The crude oil (30) may be removed from the tank (10) via a line (20), such as in FIG. 1. The water (28) may also be removed from the tank (10) by any method, e.g. through a line (26). Moreover, the method may include the step of removing any miscellaneous sediment (22), such as rocks, dirt, etc., e.g. using a removal line (24), as set forth in FIG. 1. The method may also include the step of removing the one or more aforementioned gases, e.g. through line (14), as set forth in FIG. 1.

In various embodiments, the step of separating produces a supply of crude oil (30) (e.g. flowing out of line (20)) that includes less than 55, 50, 45, 40, 35, 30, 25, 20, 15, 10, 9, 8, 7, 6, 5, 4, 3, 2, or 1 percent by weight of the polyorganosiloxane of the antifoam emulsion based on a total amount of the polyorganosiloxane supplied to the tank in the antifoam emulsion. In other embodiments, the combination of the crude oil (30), water (28), and antifoam emulsion exhibits a foam (32) having a height that is at least 50, 55, 60, 65, 70, 75, 80, 85, 90, or 95, percent less than a height of a foam produced by a control combination of the crude oil (30) and the water (28) in the absence of the antifoam emulsion. More specifically, in these embodiments, the difference in foam height may be calculated as a direct comparison to the control composition that is identical except for the instant antifoam emulsion. Alternatively, the difference in foam height may be calculated as described in the Examples below.

Additional Embodiments

This disclosure also provides a reduced foam petroleum composition including the crude oil and the pre-formed antifoam emulsion that includes a means for reducing the foam of the crude oil. In various non-limiting embodiments, the means for reducing the foam is any of the hydrophilic continuous phase and the polyorganosiloxane described above.

EXAMPLES

Examples 1-7

A series of Examples and Comparative Examples are set forth below in Table 1. The terminology "AE" denotes an "Antifoam Emulsion" that is representative of various embodiments of this disclosure. The terminology "Comp." denotes a comparative example that is not representative of this disclosure.

TABLE 1

| Example | % wt. Polymer | Continuous Phase | Polymer |
|---|---|---|---|
| AE 1 | 60 | Water | Dimethyl Siloxane, Hydroxy-terminated (Linear PDMS); $M_w$ >300,000 g/mol |
| AE 1 Dilute | 10% | Water | Dimethyl Siloxane, Hydroxy-terminated (Linear PDMS) $M_w$ >300,000 g/mol |
| AE 2 | 50 | Water | Dimethyl Siloxane, Hydroxy-terminated (Linear PDMS) $M_w$ ~116,000 g/mol |
| AE 2 Dilute | 10% | Water | Dimethyl Siloxane, Hydroxy-terminated (Linear PDMS) $M_w$ ~116,000 g/mol |
| AE 3 | 60 | Water | Dimethyl Siloxane, Hydroxy-terminated $M_w$ ~400,000 g/mol |
| AE 4 | 80 | Ether and PEG | Dimethyl, Methyl(propyl(poly(EO))hydroxy) Siloxane, Trimethylsiloxy-terminated. (Silicone glycol; PDMS with organic substituent) $M_w$ ~3,000 g/mol |
| AE 5 | 20 | Water | Dimethyl Siloxane, Trimethylsiloxy-terminated and reaction product of Dimethyl Siloxane, Vinyl-terminated and Dimethyl, methylhydrogen siloxane |

TABLE 1-continued

| Example | % wt. Polymer | Continuous Phase | Polymer |
|---|---|---|---|
| | | | (branched PDMS) $M_w$ ~20,000 g/mol |
| AE 5 Dilute | 10% | Water | Dimethyl Siloxane, Trimethylsiloxy-terminated and reaction product of Dimethyl Siloxane, Vinyl-terminated and Dimethyl, methylhydrogen siloxane (branched PDMS) $M_w$ ~20,000 g/mol |
| AE 6 | 30 | Water | Dimethyl, Methyl(propyl(poly(EO))hydroxy) Siloxane, Trimethylsiloxy-terminated (silicone glycol; PDMS with organic substituent); $M_w$ ~30,000 g/mol See, e.g. WO2007137948 |
| AE 7 | 15 | Water | Dimethyl Siloxane, Trimethylsiloxy-terminated and Silica Treated with Hydrolysis Products of Dimethyl Siloxane, Hydroxy-terminated and Polyethylsilicate (traditional AF compound with PDMS and silica) $M_w$ ~75,000 g/mol |
| Comp. 1 | 10 | Naphtha | Dimethyl Siloxane, Hydroxy-terminated (High Mol. Weight PDMS) $M_w$ >300,000 g/mol |
| Comp. 2 | 28 | Naphtha | Dimethyl Siloxane, Hydroxy-terminated (High Mol. Weight PDMS) $M_w$ ~70,000 g/mol |

More specifically, various Examples and Comparative Examples are evaluated to determine their efficiency in reducing foam in three types of crude oil. The methodology that is employed is based on Bikerman's gas sparging tube and is composed by a Glass chromatography column with a glass sinter, connected to a gas flow. The defoaming and antifoaming efficiency of the Examples and Comparative Examples are evaluated by measuring effects on foam height and foam collapse times after a specified sparging time with Nitrogen. Although the methodology is the same for the two types of crude oil, the time and the pressures are adjusted for each.

Crude Oil of API Grade 26°

To evaluate the Examples and Comparative Examples, the tube is filled with crude oil such that the top of the liquid level is at the mark of the 70 mL of the tube. Gas flow is then turned on and, after sparging the oil for 2 minutes, the gas flow is immediately turned off. Gas pressure is adjusted to give a reproducible level of foam. For this type of oil, the pressure is adjusted between 10 and 12 psi. After 4 minutes, gas flow is turned on again, the oil is sparged during 2 minutes, and the final foam height (measured at the air-foam interface, in mL) is visually recorded, as well as foam heights at every 10 seconds of time interval, until there is no foam.

Then, after 5 minutes, 20 ppm of an Example or Comparative Example is added to the crude oil, gas flow is turned on and after sparging the oil with antifoam for 2 minutes, gas flow is terminated and the foam heights are recorded again, at every 10 seconds. All samples are tested in triplicate.

The foam reduction, in percentage, is calculated according to the equation below:

$$\text{Foam reduction (\%)} = 100 - \frac{100 \times H^{AF}(t)}{H(t)}$$

wherein: H(t)=foam height of crude oil at time t
$H^{AF}(t)$=foam height of oil with antifoam at time t Crude Oil of API Grade 22°

To evaluate the Examples and Comparative Examples, the same process is followed as described immediately above relative to Crude Oil of API Grade 26°.

Crude Oil of API Grade 14.5°

In this crude oil, the aforementioned flow of nitrogen is not sufficient to produce a significant amount of foam because of the high viscosity of the crude oil. Accordingly, this crude oil is diluted in Naphtha in 1:1 proportion (mass: mass) and the pressure of the nitrogen is adjusted to give a reproducible level of foam (between 5 and 10 psi).

More specifically, the tube is filled with crude oil such that the top of the liquid level is at the mark of the 70 mL of the tube. Gas flow is then turned on and, after sparging the oil for 1 minute, the gas is immediately turned off. After 4 minutes, the oil is sparged again during 1 minute and the final foam height (measured at the air-foam interface, in mL) is visually recorded, as well as foam heights at every 10 seconds of time interval, until there is no foam. Then, after 5 minutes, 20 ppm of the antifoam emulsion are added to the oil, gas flow is turned on and after sparging the oil with the antifoam emulsion for 1 minute, gas flow is terminated and the foam heights are recorded again, at every 10 seconds. All samples are tested in triplicate. The foam reduction is also calculated using the aforementioned equation.

To eliminate some interference and maximize reproducibility, the following actions are taken during all analyses: the same sparge tube is used throughout all the evaluations; the sparge tube is flushed immediately after crude oil foaming with the following order of solvents: naphtha (3×30 mL), isopropanol (3×15 mL) and chloroform (1×15 mL); between all the replicates the sparge tube is washed with 30 mL NaOH (50%) during 15 minutes with nitrogen flow, and after that the sparge tube is washed with water for several times, ensuring that no remaining NaOH is present in the sparge tube.

Results

The results of the aforementioned evaluations are set forth in Tables 2-8 below.

Crude Oil of API Grade 26°

TABLE 2

Foam height in mL

| Time (seconds) | Comp. 1 | AE 1 | AE 1 Dilute | AE 6 | AE 5 Dilute | AE 7 |
|---|---|---|---|---|---|---|
| 0 | 72 | 56 | 32 | 6 | 16 | 38 |
| 10 | 74 | 56 | 35 | 4 | 16 | 38 |
| 20 | 75 | 56 | 34 | 5 | 22 | 38 |
| 30 | 74 | 55 | 34 | 6 | 24 | 36 |
| 40 | 74 | 52 | 33 | 6 | 27 | 36 |
| 50 | 72 | 51 | 30 | 5 | 30 | 36 |
| 60 | 72 | 47 | 28 | 2 | 32 | 34 |
| 75 | 71 | 41 | 23 | 5 | 31 | 30 |
| 90 | 68 | 34 | 17 | 4 | 33 | 25 |
| 105 | 66 | 26 | 10 | 4 | 36 | 12 |
| 120 | 60 | 11 | −2 | 6 | 40 | 8 |

TABLE 3

| | Comp. 1 | AE 1 | AE 1 Dilute | AE 6 | AE 5 Dilute | AE 7 |
|---|---|---|---|---|---|---|
| Average | 72 | 56 | 32 | 6 | 16 | 38 |
| Std Dev | 7 | 8 | 11 | 2 | 4 | 6 |

TABLE 4

T-Test Evaluation

| | |
|---|---|
| Comp. 1 vs. AE 1 | 0.00 |
| Significant difference? | Yes, >=99% |
| AE 1 Dilute vs. AE 7 | 0.15 |
| Significant difference? | No |

Crude Oil of API Grade 22°

TABLE 5

Foam height in mL

| Time (seconds) | AE 1 | AE 1 Dilute | AE 2 | AE 2 Dilute | AE 3 | AE 4 | Comp. 2 | Comp. 1 |
|---|---|---|---|---|---|---|---|---|
| 0 | 88 | 84 | 67 | 3 | 16 | 0 | 86 | 91 |
| 10 | 91 | 86 | 72 | 11 | 9 | −2 | 88 | 93 |
| 20 | 92 | 86 | 73 | 11 | 7 | −1 | 90 | 96 |
| 30 | 93 | 86 | 74 | 14 | 3 | −5 | 91 | 97 |
| 40 | 94 | 87 | 75 | 15 | −1 | −3 | 93 | 99 |
| 50 | 95 | 87 | 76 | 17 | 0 | −7 | 95 | 100 |
| 60 | 100 | 87 | 71 | 23 | −5 | −7 | 98 | 100 |
| 75 | 100 | 95 | 100 | 25 | −11 | −19 | 99 | 100 |
| 90 | 100 | 100 | 100 | 20 | −19 | −21 | 99 | 100 |
| 105 | 100 | 100 | 100 | 33 | −67 | −30 | 100 | 100 |
| 120 | 100 | 100 | 100 | 70 | −100 | −80 | 100 | 100 |

Crude Oil of API Grade 14.5°

TABLE 6

Average foam reduction (%)

| Time (seconds) | Comp. 1 | AE 1 | AE 1 Dilute |
|---|---|---|---|
| 0 | 61 | 79 | 77 |
| 10 | 60 | 8 | 76 |
| 20 | 35 | 57 | 61 |
| 30 | 25 | 39 | 48 |
| 40 | 17 | 33 | 0 |
| 50 | 0 | 0 | 0 |

TABLE 7

T-Test Evaluation

| | |
|---|---|
| Comp. 1 vs. AE 1 | 0.05 |
| Significant difference? | Yes, >=90% |
| Comp. 1 vs. AE 1 Dilute | 0.26 |
| Significant difference? | No |
| AE 1 vs. AE 1 Dilute | 0.45 |
| Significant difference? | No |

The data set forth above show that the antifoam emulsions of this disclosure perform approximately the same as many of the Comparative Examples. This similar performance, coupled with the minimization of the presence of silicon in downstream crude oil, shows that the compositions and emulsions of this disclosure perform very well.

In addition, a presence of silicon in downstream crude oil, after separation from the water, is also determined. For example, a presence of silicon in crude oil of 26° API and 22° API is determined using Atomic Absorption. Each sample is evaluated in triplicate and the averages are set forth below in Table 8.

More specifically, to generate the data set forth in Table 8, the test method "UOP 727—Silicones in petroleum distillates by Atomic Absorption Spectrophotometry" was performed at "UNICAMP—State University of Campinas" using equipment known as "Analytik Jena—NOVA A300". To prepare samples for evaluation, crude oil samples including the emulsions were submitted to a demulsification process. 100 ppm of Dissolvan 681 and 18 mL of water were added to 70 mL samples of crude oil, followed by mechanical shaking (200 shakes/minute, for 2 minutes). The samples were then placed in a 60° C. bath for 30 minutes. After this time, there was a clear interface present between two phases: crude oil (upper phase) and water (lower phase). The crude oil phase was carefully removed with a pipette and placed in another vessel. To minimize contamination with silica, only plastic vessels and pipettes are used. The samples are then evaluated using the aforementioned method and equipment and the data is set forth in Table 8 below.

TABLE 8

| Crude Oil | Sample | % Silicone | Qty Added In The Crude Oil (Ppm) | Si Supplied (ppm)* | Si Residual (ppm) | Residual/Supplied |
|---|---|---|---|---|---|---|
| API 26 | AE 1 Dilute | 10 | 20 | 0.8 | <0.4 (Detection Level) | <50% |
| | AE 1 | 60 | 20 | 4.5 | <1.1 (Quantification Level) | <30% |
| | Comp. 1 | 10 | 20 | 0.8 | 1.5 | >100% |
| API 22 | AE 1 Dilute | 10 | 20 | 0.8 | <0.4 (Detection Level) | <50% |
| | AE 1 | 60 | 20 | 4.5 | <1.1 (Quantification Level) | <25% |
| | Comp. 1 | 10 | 20 | 0.8 | 3.4 | >100% |

*There is approximately 37.84% (wt/wt) of Silicon in PDMS.

Example 8: Composition Containing an Antifoam and Demulsifier

If required, the polyglycol was diluted with ethanol and mix until a homogeneous mixture or solution was obtained. The polyglycol was added to a silicone emulsion in water slowly, under agitation (500 rpm). Agitation was increased gradually during the addition of the polyglycol. After adding all the polyglycol, agitation was continued for about 30 minutes.

TABLE 9

| Product | Description | % wt |
|---|---|---|
| Example 8 | Emulsion of polyorganosiloxane in water (50-60% of total silicone in water). The polyorganosiloxane of the internal phase are one or more of the following: Dimethyl Siloxane, Hydroxy-terminated; $M_w$ ~400,000 g/mol) blend of decamethylcyclopentasiloxane + Dimethyl Siloxane, Hydroxy-terminated; and Dimethyl Siloxane, trimethylsilosy-terminated; viscosity: 60,000 cSt | 7-60 |
| Ethanol | polar solvent | 0-25 |
| Polyglycols (such as, Demtrol ™ 1130) | copolymers of EO and PO with an RSN of about 16.4. | 30-93 |

Example 9: Composition Containing an Antifoam and Demulsifier

Following the procedure of Example 8, the following composition or blend was made: 53 weight percent of a PDMS emulsion (60 weight % solids as PDMS in water); 32 weight % of EO-PO type polyglycol polymer (such as Demtrol™ 1130); and 15 weight % of ethanol. The composition was stable for at least 1 month at 45° C. The viscosity of the composition was 700 cSt. The weight ratio of PDMS to polyglycol was 1:1.

Example 10: Composition Containing an Antifoam and Demulsifier

Following the procedure of Example 8, the following composition or blend was made: 25 weight percent of a PDMS emulsion (60% solids as PDMS in water); 75 weight percent of EO-PO type polyglycol polymer (such as Demtrol™ 1130). The composition was stable for at least 1 month at 45° C. The viscosity of the composition was 1500 cSt. The weight ratio of PDMS to polyglycol was 1:5.

Without intending to be bound by theory, it is believed to not be possible to calculate the exact portion of Si that remains in the oil because the crude oil evaluates includes naturally occurring silica. For example, analysis of the crude oil without the Sample is attempted but the crude oil itself includes from 0.4 (<detection level) up to 2.8 ppm of Si. This naturally occurring silica in the crude oil is likely the cause of the 'Si residual' to be greater than the 'Si supplied'.

Nevertheless, despite this silica content, samples of oil with AE 1 and AE 1 Dilute exhibit Si contents that are under the detection/quantification levels. Accordingly, the residual content of Si is likely no more than 25-50% of the supplied content using the antifoam emulsions of this disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are

The invention claimed is:

1. A method of reducing foam in crude oil disposed in a tank, said method comprising the steps of:
   I. supplying the crude oil to the tank wherein the crude oil comprises water;
   II. supplying a pre-formed antifoam emulsion to the tank wherein the antifoam emulsion comprises:
      (1) a hydrophilic continuous phase which consists of water selected from tap water, well water, potable water, non-potable water, salt water, sea water, purified water, or non-purified water;
      (2) a polyorganosiloxane selected from the group consisting of (i) hydroxy-terminated dimethyl siloxanes, (ii) a combination of hydroxy-terminated dimethyl siloxanes and trimethylsiloxy-terminated dimethylsiloxane fluids, (iii) a combination of hydroxy-terminated dimethyl siloxanes and cyclic polydimethylsiloxanes, and (iv) a combination of hydroxy-terminated dimethyl siloxanes, trimethylsiloxy-terminated dimethylsiloxane fluids, and cyclic polydimethylsiloxane fluids dispersed in said hydrophilic continuous phase;
      (3) one or more surfactants selected the group consisting of nonionic surfactants, anionic surfactants, cationic surfactants, and combinations thereof;
   wherein subsequent to steps (I) and (II) a combination of the crude oil, water, and the antifoam emulsion is formed; and
   III. separating the crude oil from the water in the presence of the antifoam emulsion,
   wherein the step of (III) separating is accomplished in the presence of the antifoam emulsion wherein the antifoam emulsion is free of a hydrophobic solvent.

2. The method of claim 1 wherein the tank is further defined as a gas/oil separator and the crude oil further comprises an alkane gas.

3. The method of claim 1 wherein the step of (III) separating produces a supply of crude oil that includes less than 50 percent by weight of the polyorganosiloxane based on a total amount of the polyorganosiloxane supplied to the tank in the antifoam emulsion.

4. The method of claim 1 wherein the combination of the crude oil, water, and antifoam emulsion exhibits a foam having a height that is at least 50 percent less than a height of a foam produced by a control combination of the crude oil and the water in the absence of the antifoam emulsion.

5. The method of claim 1 wherein the surfactant is selected from the group consisting of condensates of ethylene oxide with an amine, alkyl benzene sulphonates, alkyl aryl sulphonates, alkyl sulphates, alkyl alkoxylated sulphates, quaternary ammonium hydroxides, quaternary ammonium hydroxide salts, fatty amines, fatty amine derivatives, fatty acid amides, and fatty acid amide derivatives.

6. The method of claim 1 wherein the preformed antifoam emulsion further comprises a suspending agent.

7. The method of claim 1 wherein the polyorganosiloxane further comprises silica.

8. The method of claim 7 wherein the preformed antifoam emulsion further comprises a suspending agent.

* * * * *